US011758243B2

(12) United States Patent
Niedt et al.

(10) Patent No.: US 11,758,243 B2
(45) Date of Patent: Sep. 12, 2023

(54) AUTOMATED GENERATION OF PERSONALIZED CONTENT THUMBNAILS

(71) Applicants: Disney Enterprises, Inc., Burbank, CA (US); Lucasfilm Entertainment Company Ltd. LLC, San Francisco, CA (US)

(72) Inventors: Alexander Niedt, Loma Linda, CA (US); Mara Idai Lucien, Los Angeles, CA (US); Juli Logemann, Bennington, NE (US); Miquel Angel Farre Guiu, Bern (CH); Monica Alfaro Vendrell, Barcelona (ES); Marc Junyent Martin, Barcelona (ES)

(73) Assignees: Disney Enterprises, Inc., Burbank, CA (US); LucasFilm Entertainment Company Ltd. LLC., San Francisco, CA (US)

( * ) Notice: Subject to any disclaimer, the term of this patent is extended or adjusted under 35 U.S.C. 154(b) by 44 days.

(21) Appl. No.: 17/535,113

(22) Filed: Nov. 24, 2021

(65) Prior Publication Data
US 2023/0164403 A1 May 25, 2023

(51) Int. Cl.
*H04N 21/81* (2011.01)
*H04N 21/45* (2011.01)
(Continued)

(52) U.S. Cl.
CPC ....... *H04N 21/8153* (2013.01); *G06F 16/743* (2019.01); *H04N 21/4312* (2013.01);
(Continued)

(58) Field of Classification Search
CPC ............ H04N 21/252; H04N 21/4661; H04N 21/4662; H04N 21/4668
See application file for complete search history.

(56) References Cited

U.S. PATENT DOCUMENTS 8,782,709 B2   7/2014  Wang et al.
8,806,340 B2   8/2014  Lin et al.
(Continued)

OTHER PUBLICATIONS

"Dynamic Creative Optimization" *Wikipedia* dated Jan. 17, 2011.
(Continued)

*Primary Examiner* — Jason Salce
(74) *Attorney, Agent, or Firm* — Farjami & Farjami LLP

(57) ABSTRACT

A system includes a computing platform including processing hardware and a memory storing software code, a trained machine learning (ML) model, and a content thumbnail generator. The processing hardware executes the software code to receive interaction data describing interactions by a user with content thumbnails, identify, using the interaction data, an affinity by the user for at least one content thumbnail feature, and determine, using the interaction data, a predetermined business rule, or both, content for promotion to the user. The software code further provides a prediction, using the trained ML model and based on the affinity by the user, of the desirability of each of multiple candidate thumbnails for the content to the user, generates, using the content thumbnail generator and based on the prediction, a thumbnail having features of one or more of the candidate thumbnails, and displays the thumbnail to promote the content to the user.

20 Claims, 6 Drawing Sheets

(51) Int. Cl.
 *H04N 21/84* (2011.01)
 *H04N 21/466* (2011.01)
 *H04N 21/431* (2011.01)
 *H04N 21/475* (2011.01)
 *G06F 16/74* (2019.01)

(52) U.S. Cl.
 CPC ..... *H04N 21/4532* (2013.01); *H04N 21/4667* (2013.01); *H04N 21/4755* (2013.01); *H04N 21/84* (2013.01)

(56) References Cited

U.S. PATENT DOCUMENTS

| | | | |
|---|---|---|---|
| 9,552,520 | B1 | 1/2017 | Smolic et al. |
| 10,057,644 | B1 | 8/2018 | Farre Guiu et al. |
| 10,068,616 | B2 | 9/2018 | Farre Guiu et al. |
| 10,747,802 | B1* | 8/2020 | Sherrets ........... H04N 21/26603 |
| 11,308,148 | B2* | 4/2022 | Lewis ................. G06F 3/04842 |
| 11,354,894 | B2 | 6/2022 | Farre Guiu et al. |
| 2002/0002483 | A1* | 1/2002 | Siegel ................... G06F 16/951 709/206 |
| 2005/0071782 | A1* | 3/2005 | Barrett ..................... H04N 5/45 348/E7.071 |
| 2006/0020970 | A1* | 1/2006 | Utsuki ................. G06F 3/0485 725/39 |
| 2018/0336645 | A1* | 11/2018 | Price ................. H04N 21/4661 |
| 2021/0232621 | A1* | 7/2021 | Jain ........................ G06N 3/045 |
| 2022/0129285 | A1* | 4/2022 | Kwatra ................... G06F 9/451 |

OTHER PUBLICATIONS

Madeline, Lauren, Boris, Tim, Parth, Eugene and Apruva "AVA: The Art and Science of Image Discovery at Netflix" *Netflix Technology Blog Feb. 7, 2018* pp. 1-8.
U.S. Appl. No. 17/675 9723, filed Feb. 18, 2022.

* cited by examiner

AUTOMATED GENERATION OF PERSONALIZED CONTENT THUMBNAILS

BACKGROUND

Digital media content in the form of sports, news, movies, television (TV) programming, video games, and music, for example, are consistently sought out and enjoyed by consumers. Nevertheless, the popularity of a particular item of content, such as a particular movie, movie franchise, TV series, TV episode, or video game, can vary widely. In some instances, that variance in popularity may be due to fundamental differences in personal taste amongst consumers. However, in other instances, the lack of consumer interaction with digital media content may be due less to its inherent undesirability to those consumers than to their reluctance to explore content that is unfamiliar and appears unappealing.

One technique used to promote content to consumers includes displaying a thumbnail depicting characters, locations, or actions central to the storyline or theme of that content. In order for a thumbnail to effectively promote the content it represents, the images appearing in the thumbnail, as well as the composition of those images, should be both appealing and intuitively recognizable. However, what is in fact appealing and intuitively recognizable is in the eye of the beholder, and may be as individualized as any other personal taste or preference. Nevertheless, due to the resources often devoted to developing new content, the efficiency and effectiveness with which such new content can be promoted to consumers has become increasingly important to the producers, owners, and distributors of that content.

DETAILED DESCRIPTION

Figure 1:
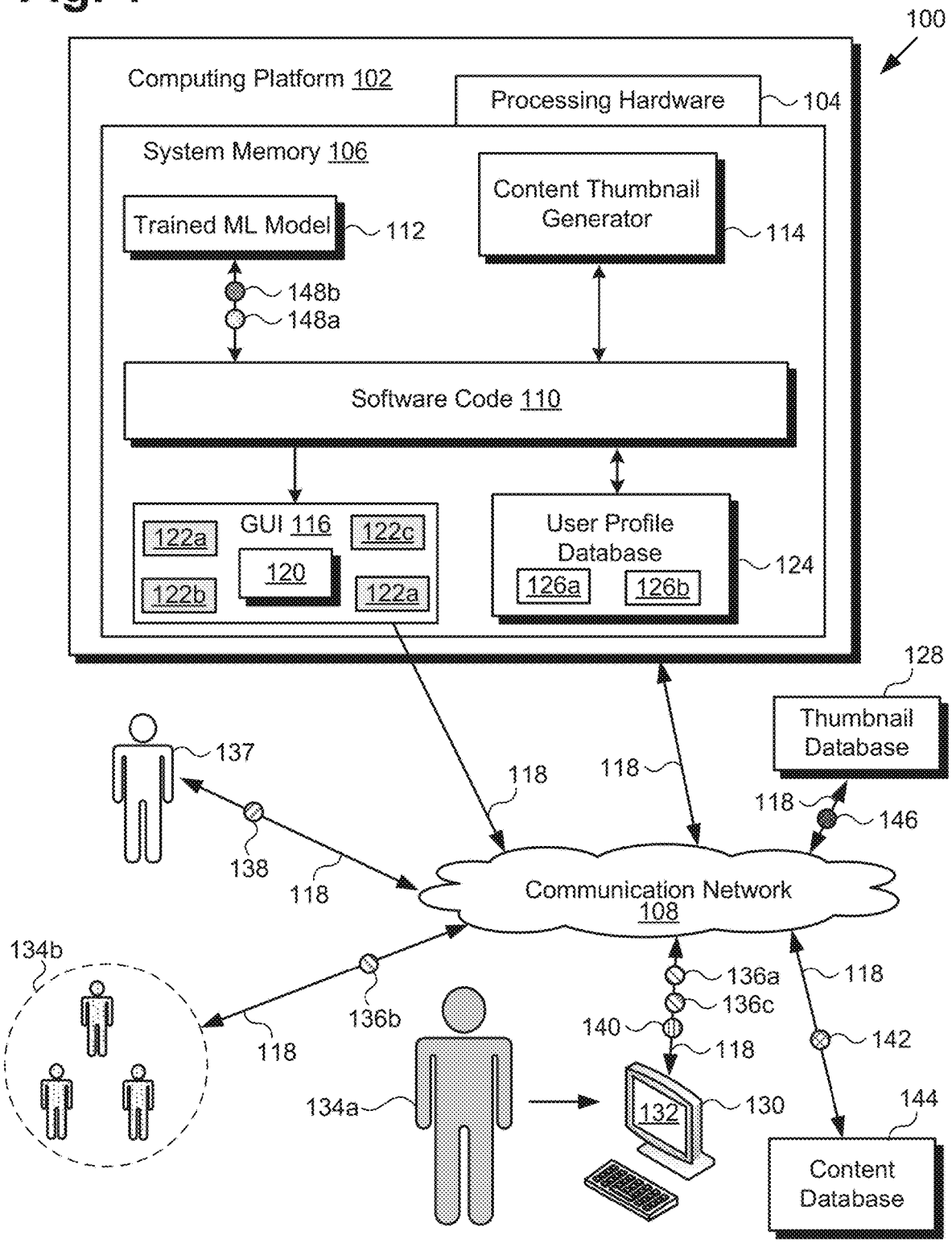
FIG. 1 shows an exemplary system for performing automated generation of personalized content thumbnails, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated generation of personalized content thumbnails. It is noted that, as defined in the present application, the terms "automation," "automated," and "automating" refer to systems and processes that do not require the participation of a human editor or system administrator. Although, in some implementations, an editor or system administrator may review or modify the personalized content thumbnails generated by the automated systems and according to the automated methods described herein, that human involvement is optional. Thus, in some implementations, the methods described in the present application may be performed under the control of hardware processing components of the disclosed automated systems.

FIG. 1 shows an exemplary system for performing automated generation of personalized content thumbnails, according to one implementation. As shown in FIG. 1, system 100 includes computing platform 102 having processing hardware 104 and system memory 106 implemented as a computer-readable non-transitory storage medium. According to the present exemplary implementation, system memory 106 stores software code 110, trained machine learning (ML) model 112, content thumbnail generator 114, and in some implementations, user profile database 124 including content consumption histories 126a and 126b of individual users, groups of users, or both. Also shown in FIG. 1 is graphical user interface (GUI) 116 provided by software code 110, content thumbnail 120 (hereinafter "thumbnail 120") and other content thumbnails 122a, 122b, 122c, and 122d (hereinafter "other content thumbnails 122a-122d") displayed via GUI 116.

As defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an N that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing, audio processing, or natural-language processing.

As further shown in FIG. 1, system 100 is implemented within a use environment including communication network 108, thumbnail database 128, content database 144, and user system 130 including display 132. In addition, FIG. 1 shows user 134a of user system 130 and system 100, other users 134b of system 100, human editor 137, interaction data 136a, 136b, and 136c, quality assurance (QA) feedback data 138, and user rating data 140. Also shown in FIG. 1 are network communication links 118 of communication network 108 interactively connecting system 100 with thumbnail database 128, content database 144, user system 130, and other communication devices utilized by other users 134b and human editor 137 (other communication devices utilized by other users 134b and human editor 137 not shown in FIG. 1).

It is noted that in some implementations, as shown in FIG. 1, user profile database 124 may be stored in system memory 106. However, in other implementations, user profile database 124 may not be a component of system 100, but may be remotely accessible to system 100 via communication network 108 and network communication links 118. It is further noted that, in some implementations, as depicted in FIG. 1, thumbnail database 128 and content database 144 may be remote from but communicatively coupled to system 100 via communication network 108 and network communication links 118. However, in other implementations, one or both of thumbnail database 128 and content database 144 may be assets of system 100, and may be stored locally in system memory 106.

Moreover, although FIG. 1 shows user profile database 120 as storing two content consumption histories 126a and 126b, that exemplary depiction is also provided merely in the interests of conceptual clarity. More generally, user profile database 120 may store more than two content consumption histories, such as hundreds, thousands, or millions of content consumption histories, for example. Furthermore, in various implementations, each of content consumption histories 126a and 126b may be a content consumption history dedicated to a particular user, such as user 134a or one of other users 134b, to a group of users, such as other users 134b, or to one or more distinct temporal sessions over which an individual user or group of users consumes content.

It is further noted that, in some implementations, content consumption histories 126a and 126b may be exclusive of personally identifiable information (PII) of user 134a or other users 134b. Thus, in those implementations, although content consumption histories 126a and 126b may serve to distinguish one anonymous user or group of users from another anonymous user or group of users, user profile database 120 does not retain information describing the age, gender, race, ethnicity, or any other PII of any user or group. However, in some implementations, such as content subscription service applications, for example, a user of system 100 may be provided an opportunity to opt in to having their PII stored.

Although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts software code 110, trained (ML) model 112, content thumbnail generator 114, and optionally user profile database 124, as being co-located in system memory 106 that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may be implemented virtually, such as in a data center. For example, in some implementations, system 100 may be implemented in software, or as virtual machines.

Although user system 130 is shown as a desktop computer in FIG. 1, that representation is also provided merely as an example. More generally, user system 130 may be any suitable mobile or stationary computing device or system that implements data processing capabilities sufficient to enable use of GUI 116, support connections to communication network 108, and implement the functionality ascribed to user system 130 herein. For example, in other implementations, user system 130 may take the form of a laptop computer, tablet computer, smart TV, game platform, smartphone, or smart wearable device, such as a smartwatch, for example.

Display 132 of user system 130 may take the form of a liquid crystal display (LCD), a light-emitting diode (LED) display, an organic light-emitting diode (OLED) display, a quantum dot (QD) display, or any other suitable display screen that performs a physical transformation of signals to light. It is noted that, in some implementations, display 132 may be integrated with user system 130, such as when user system 130 takes the form of a laptop or tablet computer for example. However, in other implementations, for example where user system 130 takes the form of a computer tower in combination with a desktop monitor, display 132 may be communicatively coupled to, but not physically integrated with user system 130.

Figure 2:
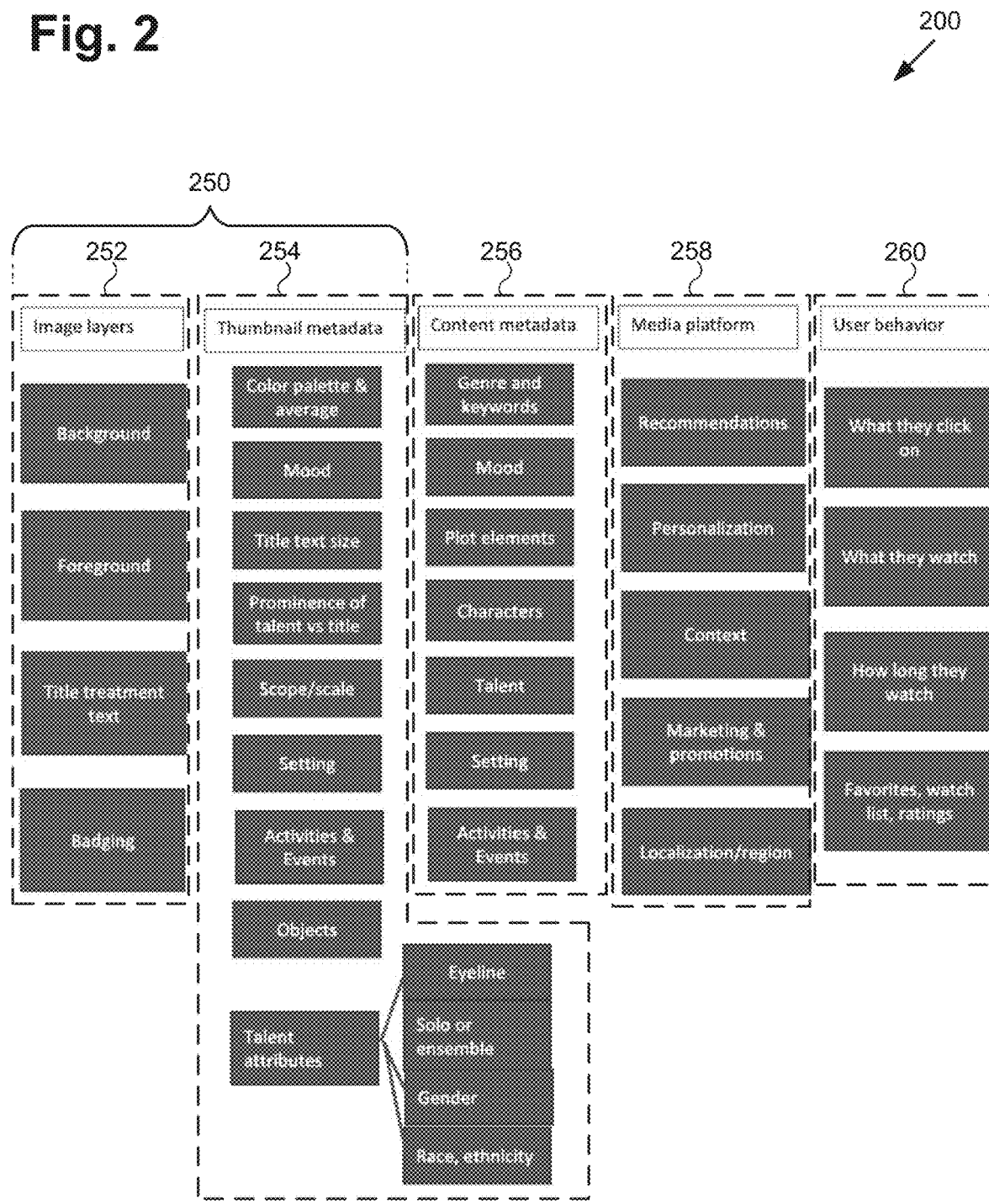
FIG. 2 shows a diagram depicting exemplary parameters that may influence the generation and display of personalized content thumbnails, according to one implementation.

FIG. 2 shows diagram 200 depicting exemplary parameters that may influence the generation and display of personalized content thumbnails, according to one implementation. As shown in FIG. 2, the parameters influencing generation of a personalized content thumbnail may include content thumbnail features 250 including image layers 252 of the content thumbnail and features described by thumbnail metadata 254. As further shown in FIG. 2, image layers of a content thumbnail may include its background, foreground, and title treatment text, such as text font, for example, as well as badging. Content thumbnail features described by thumbnail metadata 254 may include the color palette and average color of the content thumbnail, the mood it conveys, title text size, the prominence of the talent shown by the content thumbnail versus its title, and the scope or scale depicted, i.e., whether the content thumbnail depicts an intimate close-up image, an "epic" panoramic image, or something in between. In addition, content thumbnail features described by thumbnail metadata 254 may also include the setting, activities and events, and objects depicted by the content thumbnail, as well as attributes of the depicted talent, such as eyeline, whether the talent is a solo talent or an ensemble, and the gender, race, or ethnicity of the talent.

With respect to the expression "talent," it is noted that as defined in the present application, "talent" refers to a featured performer or performers appearing in content being promoted by a content thumbnail. Thus, talent may include one or more human actors, one or more characters portrayed by human actors, one or more animated characters, participant, performer, reporter, or any combination thereof. Moreover, as defined herein, the expression "eyeline" refers to the gaze direction of talent depicted in a content thumbnail, such as whether the talent appears to be gazing outward at a user viewing the content thumbnail, at other talent or an object included in the content thumbnail, or in an adverted fashion into the distance, without direction toward other talent or an object.

In addition to content thumbnail features 250, the parameters influencing generation of a personalized content thumbnail may further include content metadata 256 describing one or more of genre and keywords of the content promoted by the content thumbnail, the mood of the content, as well as its plot elements, characters, talent, setting, and activities and events. Other parameters influencing generation of a personalized content thumbnail may include media platform parameters 258 specific to the media platform on which content is to be promoted, such as techniques used by the media platform to generate recommendations and to provide personalization, the context in which content thumbnails are displayed by the media platform, marketing and promotional techniques used by the media platform, and localization based on regional differences in taste, sensibility, or regulation.

Another group of parameters influencing generation of a personalized content thumbnail may include user behavior parameters 260, such as the behavior of individual user 134a, or group of other users 134b. User behavior parameters 260 may include content or promotions that a user or group "clicks on" or otherwise selects or interacts with, content watched by a user or group, how long a user or members of a group tend to watch content they have selected, the speed with which a user selects a particular item of content, i.e. the time lapse from when a particular item of content is displayed until it is selected by the user, and favorites lists, watch lists, and ratings identified or provided by the user or group, to name a few examples. Referring to FIGS. 1 and 2 in combination, it is noted that some of user behavior parameters 260 may be included in interaction data 136a, 136b, and 136c, while some others of user behavior parameters 260 may be included in user rating data 140. Yet others of user behavior parameters 260 may be obtained from user profile database 124.

It is further noted that, in some implementations, as described above by reference to content consumption histories 126a and 126b, user behavior parameters 260 may be exclusive of PII of user 134a or other users 134b. Thus, in those implementations, although user behavior parameters 260 may serve to distinguish one anonymous user or group of users from another anonymous user or group of users, user behavior parameters 260 do not retain information describing the age, gender, race, ethnicity, or any other PII of any user or group. However, in some implementations, such as content subscription service applications, for example, a user of system 100 may be provided an opportunity to opt in to having their PII stored.

It is also noted that although the methods and systems disclosed by the present application are described by reference to a specific use case in which personalized content thumbnails are generated to promote various types of digital media content to a user, such as content in the form of sports, news, movies, television (TV) programming, video games, and music, for example, the present concepts may be readily applied to the generation of personalized thumbnails for the promotion of a wide variety of other assets. Examples of other assets that may be promoted to users via the generation of personalized thumbnails include collectable items, including non-fungible tokens (NFTs), entertainment events, and real-world attractions, such as theme park attractions, to name a few.

Figure 3A:
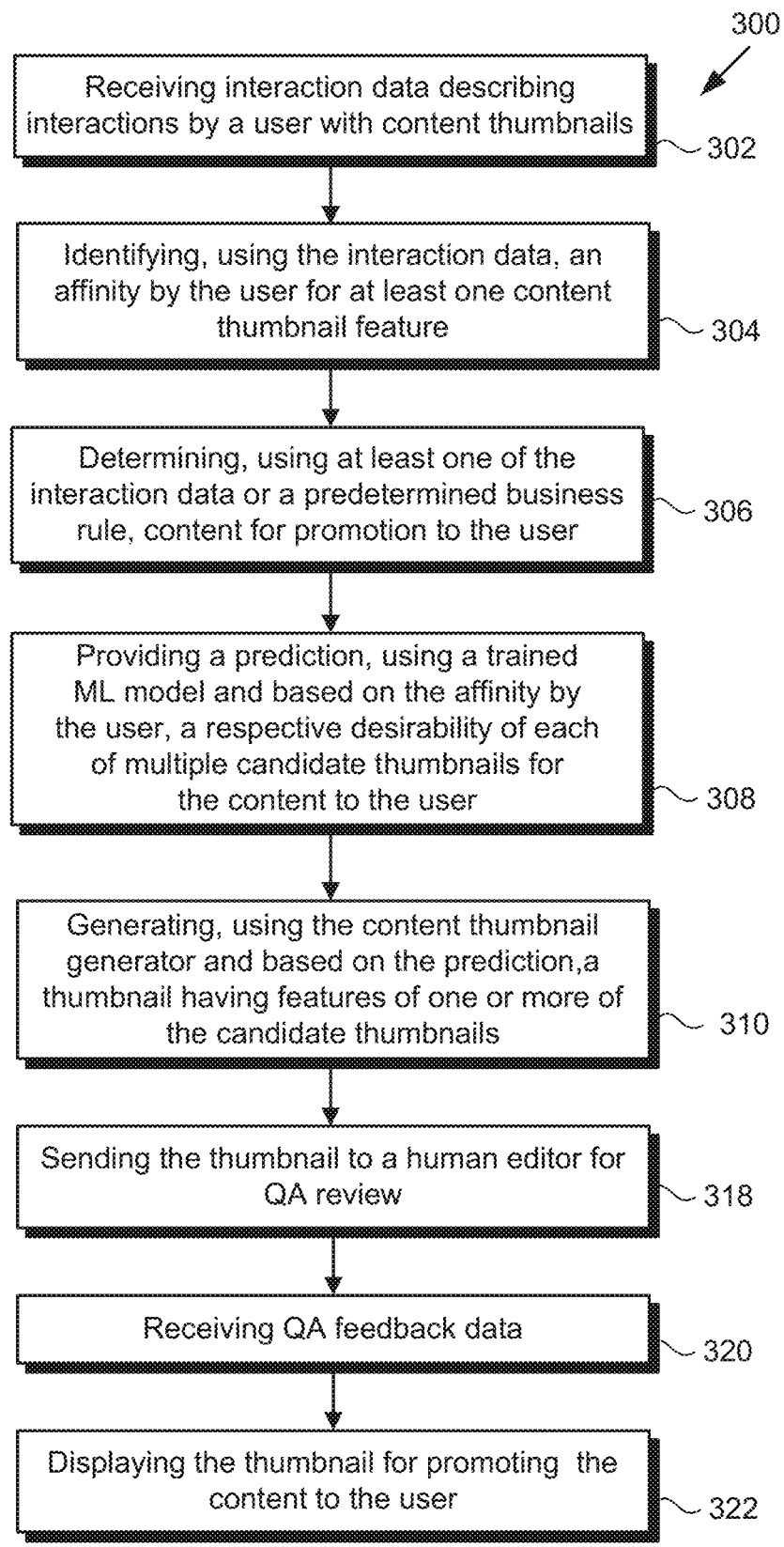
FIG. 3A shows a flowchart outlining an exemplary method for performing automated generation of personalized content thumbnails, according to one implementation.
Figure 3B:
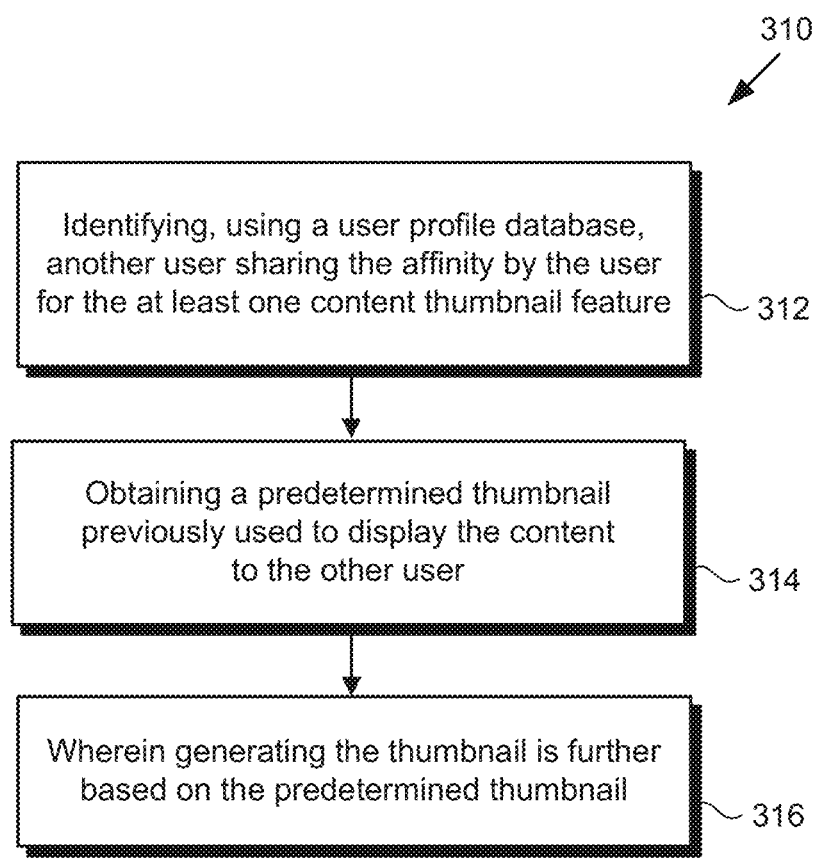
FIG. 3B shows a flowchart providing a more detailed outline of action 310 in FIG. 3A, according to one implementation.
Figure 3C:
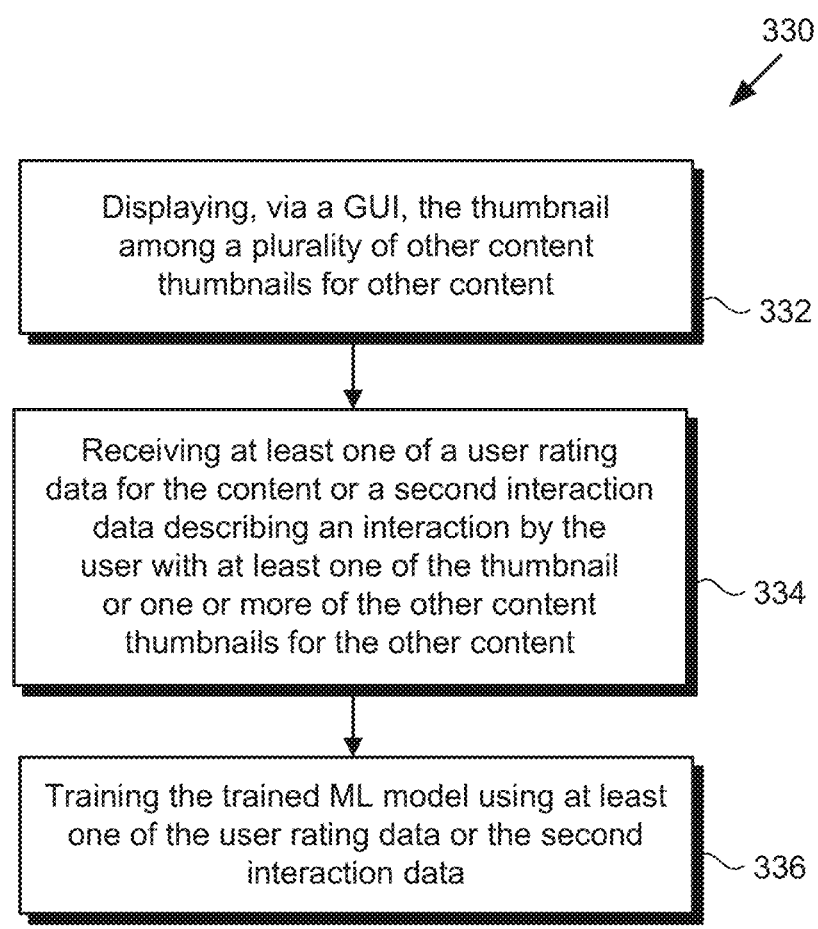
FIG. 3C shows a flowchart outlining additional exemplary actions for extending the method shown in FIG. 3A, according to one implementation.
Figure 3D:
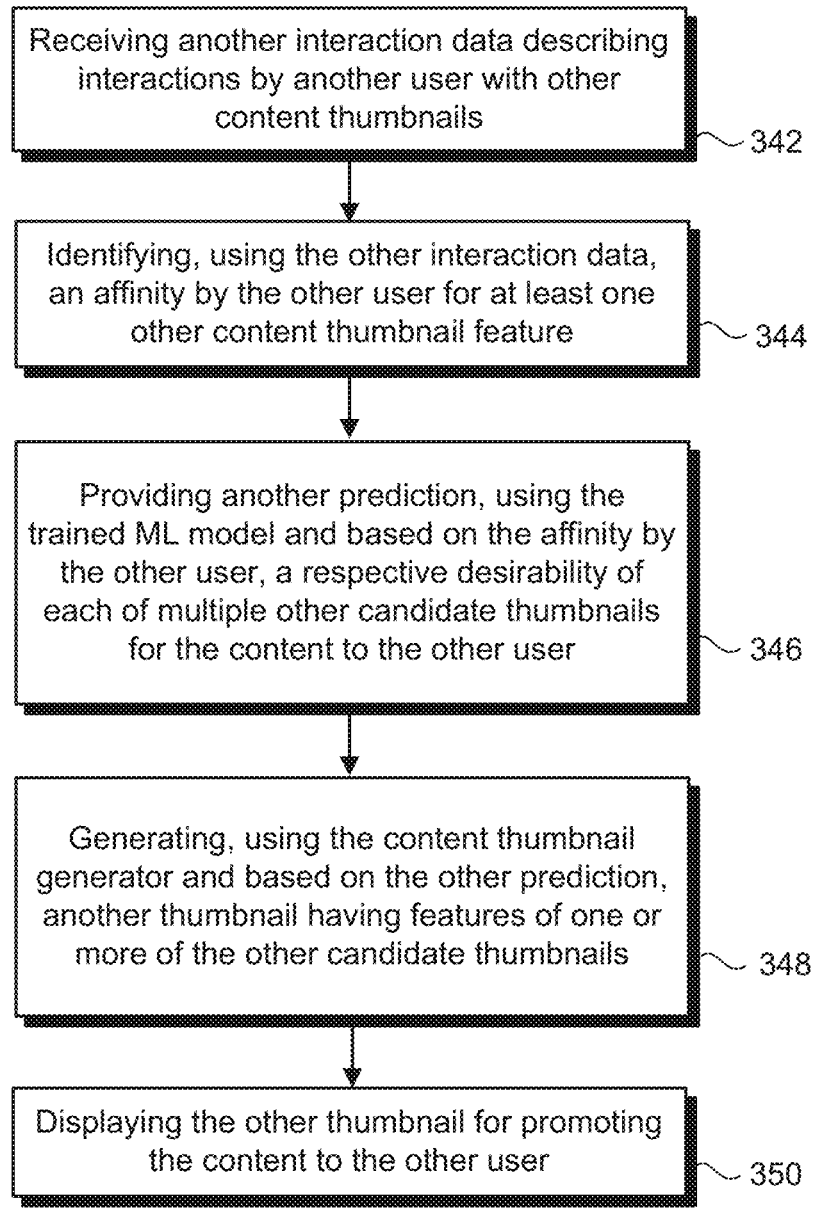
FIG. 3D shows a flowchart outlining yet more exemplary actions for extending the method shown in FIG. 3A.

The functionality of system 100 and software code 110, in FIG. 1, will be further described by reference to FIGS. 3A, 3B, 3C, and 3D (hereinafter "FIGS. 3A-3D"). FIG. 3A shows flowchart 300 presenting an exemplary method for performing automated generation of personalized content thumbnails, according to one implementation, while FIG. 3B shows flowchart 310 providing a more detailed outline of action 310 in FIG. 3A, according to one implementation. In addition, FIGS. 3C and 3D show respective flowcharts 330 and 340 outlining additional exemplary actions for extending the method shown in FIG. 3A. With respect to the actions outlined in FIGS. 3A-3D, it is noted that certain details and features have been left out of flowcharts 300, 310, 330, and 340 in order not to obscure the discussion of the inventive aspects disclosed in the present application.

Referring to FIG. 3A in combination with FIG. 1, flowchart 300 begins with receiving interaction data 136a describing interactions by user 134a with content thumbnails (action 302). For example, user 134a may utilize user system 130 to interact with, i.e., view, mouse over or otherwise partially activate, or click on or otherwise select one or more content thumbnails accessible on thumbnail database 128, content database 144, or both. As shown by FIG. 1, interaction data 136a may be received from user 134a by system 100 via user system 130, communication network 108, and network communication links 118. In those implementations, interaction data 136a may be received by software code 110, executed by processing hardware 104 of computing platform 102.

Further referring to FIG. 2, interaction data 136a may include content thumbnail features 250 of various content thumbnails with which user 134a interacts, as well as content metadata 256 describing content associated with each such content thumbnail, and media platform parameters 258, described above. In addition, interaction data 136a may include some of user behavior parameters 260, such as which content thumbnails user 134a clicks on or otherwise selects, the speed with which user 134a selects a content thumbnail once it has been displayed, as well as, in some implementations, which content thumbnails are displayed to user 134a but are ignored by user 134a.

Continuing to refer to FIGS. 1 and 3 in combination, flowchart 300 further includes identifying, using interaction data 136a, an affinity by user 134a for at least one content thumbnail feature (action 304). Further referring to FIG. 2, the content thumbnail feature or features (hereinafter "content thumbnail feature(s)") for which user 134a is identified as having an affinity in action 304 may include any of content thumbnail features 250 described above. That is to say, in some implementations, the content thumbnail feature(s) for which user 134a is identified as having an affinity may include one or more of a text font, text size, conveyed mood, or color palette of the content thumbnail, as well as one or more attributes of talent depicted by the content thumbnail, for example.

In addition, or alternatively, the content thumbnail feature(s) for which user 134a is identified as having an affinity may include an audio cue configured to be triggered by an interaction by the user with the content thumbnail. Examples of such an audio cue may include a character utterance, music, or a sound effect characteristic of the content represented by the content thumbnail, to name a few.

According to some implementations, identifying the affinity by user 134 for particular content thumbnail feature(s) may be further based on the content consumption history of user 134a. For example, in implementations in which content consumption history 126a includes the content consumption history of user 134a, identifying the affinity by user 134a for content thumbnail feature(s) in action 304 may further use content consumption history 126a of user 134a. Content consumption history 126a may include some of user behavior parameters 260, described above by reference to FIG. 2, such as content watched by 134a, how long user 134a tends to watch content they have selected, and a favorites list, watch list, and ratings identified or provided by user 134a.

As discussed above by reference to FIG. 1, in some implementations, system memory 106 may store user profile database 124 including content consumption history 126a of user 134a. Identification of the affinity by user 134a for content thumbnail feature(s) in action 304 may be performed by software code 110, executed by processing hardware 104 of computing platform 102.

Referring to FIGS. 1 and 3 in combination, flowchart 300 further includes determining, using at least one of interaction data 136a or a predetermined business rule, content for promotion to user 134a (action 306). For example, content represented by a content thumbnail which user 134a has clicked on or otherwise selected or interacted with may be identified, based on that/those interactions as likely to be desirable to user 134a. That content may be determined to be worthwhile promoting to user 134a through use of a personalized content thumbnail generated specifically for user 134a.

Alternatively, or in addition, in some implementations there may be a business reason to promote certain content, e.g., "content A," over other content, because content A is new content, or a sequel or continuation of a content franchise, for example. In those implementations, content A may be promoted to all users, or to users having an affinity for the genre to which content A belongs, for example, based on a business rule that has been predetermined and programmed into software code 110 by an administrator of system 100. A determination that user 134a has an affinity for the genre to which business rule promoted content A belongs may be made based on interaction data 136a, a content consumption history of user 134a stored in user profile database 124, or both. Thus, determination of the content for promotion to user 134a in action 306 may be performed by software code 110, executed by processing hardware 104 of computing platform 102, and using at least one of interaction data 136a or a predetermined business rule.

Continuing to refer to FIGS. 1 and 3 in combination, flowchart 300 further includes providing a prediction, using trained ML model 112 and based on the affinity by user 134a identified in action 304, the respective desirability of each of multiple candidate thumbnails for the content determined for promotion to user 134a in action 306, to user 134a (action 308). For example, where user 134a is identified as having an affinity for three different content thumbnail features "A," "B," and "C," candidate thumbnails including feature A alone, feature B alone, feature C alone, features A and B in combination, features A and C in combination, features B and C in combination, and features A, B, and C in combination may be evaluated and compared using trained ML model 112 to predict the desirability of each of those candidate thumbnails to user 134a. Action 308 may be performed by software code 110, executed by processing hardware 104 of computing platform 102, using trained ML model 112, as noted above.

Continuing to refer to FIGS. 1 and 3 in combination, flowchart 300 further includes generating, using content thumbnail generator 114 and based on the prediction provided in action 308, thumbnail 120 having features of one or more of the candidate thumbnails described above (action 310). By way of example, where one of the candidate thumbnails is predicted to be the most desirable to user 134a, that candidate thumbnail may be generated as thumbnail 120 in action 310. However, in implementations in which two or more alternative candidate thumbnails are predicted to be of substantially equal desirability to user 134a, features from each of those alternative candidate thumbnails may be included in thumbnail 120 generated in action 310. Generation of thumbnail 120 in action 310 may be performed by software code 110, executed by processing hardware 104 of computing platform 102, and using content thumbnail generator 114, as noted above.

Referring to FIGS. 3A, 3B, and 1 in combination, flowchart 310 in FIG. 3B provides a more detailed outline of action 310 in FIG. 3A. As shown by flowchart 310 in FIG. 3B, action 310 in FIG. 3A may include identifying, using user profile database 124, one or more other users 134b sharing the affinity by user 134a for the content thumbnail feature(s) identified in action 304 (action 312). In addition, action 310 may further include obtaining a predetermined thumbnail previously displayed to promote the content to user 134a in action 306, to one or more other users 134b (action 314). In implementations in which action 310 includes action 312 and 314, action 310 may also include generating thumbnail 120 further based on the predetermined thumbnail obtained in action 314 (action 316). When included in action 310, actions 312, 314, and 316 may be performed by software code 110, executed by processing hardware 104 of computing platform 102.

Referring once again to FIGS. 1 and 3A in combination, in some implementations, flowchart 300 may further include sending thumbnail 120 to human editor 137 for QA review (action 318). For example, after initial training of trained ML model 112, or in use cases in which thumbnail includes multiple features from multiple candidate thumbnails, it may be advantageous or desirable to obtain human validation of thumbnail 120 from human editor 137. As shown by FIG. 1, thumbnail 120 may be sent to human editor 137 via communication network 108 and network communication links 118. Action 318 may be performed by software code 110, executed by processing hardware 104 of computing platform 102.

In implementations in which the method outlined by flowchart 300 includes action 318, flowchart 300 may further include receiving QA feedback data 138 (action 320). As shown by FIG. 1, QA feedback data 138 may be received from human editor 138 by system 100 via communication network 108 and network communication links 118. In those implementations, QA feedback data 138 may be received by software code 110, executed by processing hardware 104 of computing platform 102.

Continuing to refer to FIGS. 1 and 3A in combination, flowchart 300 further includes displaying thumbnail 120 generated in action 310 to promote the content to user 134a in action 306 (action 322). As shown in FIG. 1, thumbnail 120 may be displayed to user 134a via GUI 116 provided by software code 110. Thus, the content determined for promotion to user 134a in action 306 may be promoted to user 134a, by displaying thumbnail 120 in action 322, by software code 110, executed by processing hardware 104 of computing platform 102.

It is noted that the involvement of human editor 137 in the method outlined by flowchart 300 is optional. That is to say, in some implementations, flowchart 300 may omit actions 318 and 320, and may be performed as an automated process. In those implementations, action 310, including in some implementations actions 312, 314, and 316, may be followed directly by action 322.

In some implementations, the method outlined by flowchart 300 may conclude with action 322 described above. However, as shown by FIG. 3C, in some implementations, the actions outlined by flowchart 300 may be supplemented by one or more of the further actions outlined by flowchart 330. Referring to FIGS. 1 and 3C in combination, flowchart 330 may include displaying, via GUI 116, thumbnail 120 among other content thumbnails 122a-122d for other content (action 332). Bearing in mind that thumbnail 120 represents the content being promoted to user 134a, action 332 may include one or both of selecting other content thumbnails 122a-122d or arranging the display of other content thumbnails 122a-122d, so as to attract user 134a to thumbnail 120.

By way of example, in some implementations, user 134a may be preferentially attracted to thumbnail 120 over other content thumbnails 122a-122d using color effects, lighting effects, or the positioning of thumbnail 120 among other content thumbnails 122a-122d. That is to say, in various implementations, thumbnail 120 may appear "center stage" in the middle of an array of content thumbnails including thumbnail 120 and other content thumbnails 122a-122d, or at the top of a list of content thumbnails including thumbnail 120 and other content thumbnails 122a-122d. In addition, or alternatively, thumbnail 120 may be brightly colored, while other content thumbnails 122a-122b may be displayed using muted color palettes. As yet another alternative, or in addition, thumbnail 120 may be displayed having a spotlight lighting effect, while other content thumbnails may lack such a lighting enhancement, or may be shown to be in shadow. When included in flowchart 330, action 332 may be performed by software code 110, executed by processing hardware 104 of computing platform 102.

Alternatively, or in addition, flowchart 330 may further include receiving one or both of user rating data 140 for the content displayed to user 134a in action 322, or interaction data 136c describing an interaction by user 134a with one or more of thumbnail 120 and other content thumbnails 122a-122d (action 334). That is to say, in various implementations, flowchart 330 may include action 332 but omit action 334, may include action 334 but omit action 332, or may include both of actions 332 and 334.

User rating data 140 may rate the enjoyment, by user 134a, of the content represented and promoted by thumbnail 120, as a result of selection and consumption or partial consumption of that content by user 134a. Interaction data 136c may reveal the extent to which user 134a interacts with one or more content thumbnails included among other content thumbnails 122a-122d, in lieu of, or in addition to, selection or other interaction by user 134a with thumbnail 120. As shown by FIG. 1, interaction data 136c, user rating data 140, or both, may be received from user 134a by system 100 via user system 130, communication network 108, and network communication links 118. In those implementations, one or both of interaction data 136c and user rating data 140 may be received by software code 110, executed by processing hardware 104 of computing platform 102.

It is noted that interaction data 136c, user rating data 140, or both, provide feedback to system 100 regarding the predictive performance of trained ML model 112. Accordingly, in some implementations in which flowchart 330 includes action 334, flowchart 330 may further include training trained ML model 112 using one or more of user rating data 140 and interaction data 136c (action 336). The ongoing training of trained ML model 112 using instances of one or more of user rating data 140 and interaction data 136c received from multiple users, including user 134a, can advantageously serve to improve the performance of trained ML model 112, as well as that of system 100 as a whole, over time. Training of trained ML model 112 using one or more of user rating data 140 and interaction data 136c in action 336 may be performed by software code 110, executed by processing hardware 104 of computing platform 102.

Referring to FIG. 3D, in some implementations, the method outlined by flowchart 300, in FIG. 3A, may be further extended by the actions outlined by flowchart 340. Referring to FIGS. 1 and 3D in combination, flowchart 340 includes receiving interaction data 136b describing interactions by one or more of other users 134b with other content thumbnails (action 342). As shown by FIG. 1, interaction data 136b may be received from one or more of other user 134b by system 100 via communication network 108 and network communication links 118. In those implementations, interaction data 136b may be received by software code 110, executed by processing hardware 104 of computing platform 102.

Continuing to refer to FIGS. 1 and 3D in combination, flowchart 340 further includes identifying, using interaction data 136b, an affinity by one or more other users 134b for one or more other content thumbnail features (action 344). Action 344 may be performed by software code 110, executed by processing hardware 104 of computing platform 102, in a manner analogous to that described above by reference to action 304.

Flowchart 340 further includes providing another prediction, using trained ML model 112 and based on the affinity by one or more of other users 134b identified in action 344, of the respective desirability of each of other candidate thumbnails for the content determined for promotion to user 134a in action 306, to one or more other users 134b (action 346). Action 346 may be performed by software code 110, executed by processing hardware 104 of computing platform 102, in a manner analogous to that described above by reference to action 308.

Flowchart 340 further includes generating, using content thumbnail generator 114 and based on the prediction provided in action 346, another thumbnail using features of one or more of the other candidate thumbnails evaluated by trained ML model 112 in action 346 (action 348). Action 348 may be performed by software code 110, executed by processing hardware 104 of computing platform 102, in a manner analogous to that described above by reference to action 310. Moreover, in some implementations, action 348 may include additional actions analogous to and corresponding in general to actions 312, 314, and 316 (hereinafter "actions 312-314") outlined by flowchart 310, in FIG. 3B.

Flowchart 340 further includes displaying, to one or more other users 134b using the other thumbnail generated in action 348, the same content displayed to user 134a using thumbnail 120 in action 322 (action 350). That is to say the same content promoted to user 134a using thumbnail 120 specifically generated and personalized for user 134a is displayed to one or more other users 134b using another thumbnail generated and personalized for one or more other users 134b, in action 350. Action 350 may be performed by software code 110, executed by processing hardware 104 of computing platform 102, in a manner analogous to that described above by reference to action 322. In addition, in some implementations, actions 342, 344, 346, 348, and 350 (hereinafter "actions 342-350") outlined by flowchart 340 may be followed by actions analogous to and corresponding in general to action 332, action 334, actions 332 and 334, actions 334 and 336, or actions 332, 334, and 336 (hereinafter "actions 332-336") outlined by flowchart 330, in FIG. 3C.

With respect to the method outlined by flowchart 300, in FIG. 3A, and the additional actions outlined by flowcharts 310, 330, and 340 in respective FIGS. 3B, 3C, and 3D, it is emphasized that actions 302, 304, 306, and 308 (hereinafter "actions 302-308") and actions 310 and 322, or actions 302-308, action 310 including actions 312-316, and action 322, or actions 302-308 and actions 310, 322, and 332, or actions 302-308, action 310 including actions 312-316, and actions 322, and 332, or actions 302-308 and actions 310, 322, and 334, or actions 302-308, action 310 including actions 312-316, and actions 322, and 334, or actions 302-308 and actions 310, 322, 332, and 334, or actions 302-308, action 310 including actions 312-316, and actions 322, 332 and 334, or actions 302-308 and actions 310, 322, 334, and 336, or actions 302-308, action 310 including actions 312-316, and actions 322, 334 and 336, or actions 302-308 and actions 310, 322, and actions 332-336, or actions 302-308, action 310 including actions 312-316, and actions 322, and 332-36, or actions 302-308 and actions 310, 322, 332, and actions 342-350, or actions 302-308, action 310 including actions 312-316, action 322, and actions 332 and 342-350, or actions 302-308 and actions 310, 322, 334, and actions 342-350, or actions 302-308, action 310 including actions 312-316, action 322, and actions 334 and 342-350, or actions 302-308 and actions 310, 322, 332, 334, and actions 342-350, or actions 302-308, action 310 including actions 312-316, action 322, and actions 332, 334 and 342-350, or actions 302-308 and actions 310, 322, 334, 336, and actions 342-350, or actions 302-308, action 310 including actions 312-316, action 322, and actions 334, 336 and 342-350, or actions 302-308 and actions 310, 322, 332-336, and actions 342-350, or actions 302-308, action 310 including actions 312-316, action 322, and actions 332-336 and 342-350, may be performed in an automated process from which human involvement may be omitted.

Thus, the present application discloses systems and methods for performing automated generation of personalized content thumbnails. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a processing hardware and a system memory;
the system memory storing a software code, a trained machine learning (ML) model, and a content thumbnail generator;
the processing hardware configured to execute the software code to:
receive interaction data describing interactions by a user with a plurality of content thumbnails each having a corresponding plurality of content thumbnail features;
identify, using the interaction data, an affinity by the user for at least one of the one or more content thumbnail features;
determine, using at least one of the interaction data or a predetermined business rule, content for promotion to the user;
provide a prediction, using the trained ML model and based on the affinity by the user for the at least one of the one or more content thumbnail features, of a respective desirability of each of a plurality of candidate thumbnails for promoting the content to the user;
generate, using the content thumbnail generator and the prediction based on the affinity by the user for the at least one of the one or more content thumbnail features, a thumbnail having features of one or more of the plurality of candidate thumbnails; and
display the thumbnail for promoting the content to the user.

2. The system of claim 1, wherein the processing hardware is further configured to execute the software code to provide a graphical user interface (GUI), and to display, via the GUI, the thumbnail among a plurality of other content thumbnails for other content.

3. The system of claim 2, wherein the processing hardware is further configured to execute the software code to:
select the plurality of other content thumbnails or arrange the display of the plurality of other content thumbnails, so as to attract the user to the thumbnail.

4. The system of claim 2, wherein the processing hardware is further configured to execute the software code to:
receive at least one of a user rating data for the content or a second interaction data describing an interaction by the user with at least one of the thumbnail or one or more of the plurality of other content thumbnails for the other content; and train the trained ML model using the at least one of the user rating data or the second interaction data.

5. The system of claim 1, wherein the system memory further stores a user profile database including a content consumption history of the user, and wherein identifying the affinity by the user for the at least one content thumbnail feature further uses the content consumption history of the user.

6. The system of claim 5, wherein the processing hardware is further configured to execute the software code to:
identify, using the user profile database, another user sharing the affinity by the user for the at least one content thumbnail feature;
obtain a predetermined thumbnail previously displayed to promote the content to the another user; and
wherein generating the thumbnail is further based on the predetermined thumbnail.

7. The system of claim 5, wherein the interaction data and the content consumption history omit any personally identifiable information (PII) of the user.

8. The system of claim 1, wherein the processing hardware is further configured to execute the software code to:
receive another interaction data describing interactions by another user with another plurality of content thumbnails;
identify, using the another interaction data, an affinity by the another user for at least one other content thumbnail feature;
provide another prediction, using the trained ML model and based on the affinity by the another user, of a respective desirability of each of another plurality of candidate thumbnails for the content to the another user;
generate, using the content thumbnail generator and based on the another prediction, another thumbnail using features of one or more of the another plurality of candidate thumbnails; and
display the another thumbnail to promote the content to the another user.

9. The system of claim 1, wherein the at least one content thumbnail feature for which the user has the affinity comprises one or more of a text font, text size, conveyed mood, color palette, or one or more attributes of talent depicted by a content thumbnail.

10. The system of claim 1, wherein the at least one content thumbnail feature for which the user has the affinity comprises an audio cue configured to be triggered by an interaction by the user with a content thumbnail.

11. A method for use by a system including a computing platform having a processing hardware and a system memory storing a software code, a trained machine learning (ML) model, and a content thumbnail generator, the method comprising:
receiving, by the software code executed by the processing hardware, interaction data describing interactions by a user with a plurality of content thumbnails each having a corresponding plurality of content thumbnail features;
identifying, by the software code executed by the processing hardware using the interaction data, an affinity by the user for at least one of the one or more content thumbnail features;
determining, by the software code executed by the processing hardware using at least one of the interaction data or a predetermined business rule, content for promotion to the user;
providing a prediction, by the software code executed by the processing hardware using the trained ML model and based on the affinity by the user for the at least one of the one or more content thumbnail features, of a respective desirability of each of a plurality of candidate thumbnails for promoting the content to the user;
generating, by the software code executed by the processing hardware using the content thumbnail generator and the prediction based on the affinity by the user for the at least one of the one or more content thumbnail features, a thumbnail having features of one or more of the plurality of candidate thumbnails; and
display, by the software code executed by the processing hardware, the thumbnail to promote the content to the user.

12. The method of claim 11, further comprising
providing, by the software code executed by the processing hardware, a graphical user interface (GUI); and
displaying, by the software code executed by the processing hardware and via the GUI, the thumbnail among a plurality of other content thumbnails for other content.

13. The method of claim 12, method further comprising:
selecting the plurality of other content thumbnails or arranging the display of the plurality of other content thumbnails, by the software code executed by the processing hardware, so as to attract the user to the thumbnail.

14. The method of claim 12, further comprising:
receiving, by the software code executed by the processing hardware, at least one of a user rating data for the content or a second interaction data describing an interaction by the user with at least one of the thumbnail or one or more of the plurality of other content thumbnails for the other content; and
training, by the software code executed by the processing hardware, the trained ML model using the at least one of the user rating data or the second interaction data.

15. The method of claim 11, wherein the system memory further stores a user profile database including a content consumption history of the user, and wherein identifying the affinity by the user for the at least one content thumbnail feature further uses the content consumption history of the user.

16. The method of claim 15, further comprising:
identifying, by the software code executed by the processing hardware using the user profile database, another user sharing the affinity by the user for the at least one content thumbnail feature;
obtaining, by the software code executed by the processing hardware, a predetermined thumbnail previously displayed to promote the content to the another user; and
wherein generating the thumbnail is further based on the predetermined thumbnail.

17. The method of claim 15, wherein the interaction data and the content consumption history omit any personally identifiable information (PII) of the user.

18. The method of claim 11, further comprising:
receiving, by the software code executed by the processing hardware, another interaction data describing interactions by another user with another plurality of content thumbnails;
identifying, by the software code executed by the processing hardware using the another interaction data, an affinity by the another user for at least one other content thumbnail feature;

providing another prediction, by the software code executed by the processing hardware using the trained ML model and based on the affinity by the another user, of a respective desirability of each of another plurality of candidate thumbnails for the content to the another user;

generating, by the software code executed by the processing hardware using the content thumbnail generator and based on the another prediction, another thumbnail using features of one or more of the another plurality of candidate thumbnails; and displaying, by the software code executed by the processing hardware, the another thumbnail to promote the content to the another user.

19. The method of claim 11, wherein the at least one content thumbnail feature for which the user has the affinity comprises one or more of a text font, text size, conveyed mood, color palette, or one or more attributes of talent depicted by a content thumbnail.

20. The method of claim 11, wherein the at least one content thumbnail feature for which the user has the affinity comprises an audio cue configured to be triggered by an interaction by the user with a content thumbnail.

\* \* \* \* \*